(12) United States Patent
Kienke et al.

(10) Patent No.: US 8,240,768 B2
(45) Date of Patent: Aug. 14, 2012

(54) ADJUSTER

(75) Inventors: Ingo Kienke, Wermelskirchen (DE); Juergen Otto, Burscheid (DE); Mario Budweg, Huckeswagen (DE); Albert Reginold Kirubaharan, Burscheid (DE); Bruce A. Hiemstra, Ann Arbor, MI (US); Michael Kapusky, Milan, MI (US); Michael Bittner, Canton, MI (US)

(73) Assignee: Johnson Controls GmbH, Burscheid (DE)

( * ) Notice: Subject to any disclaimer, the term of this patent is extended or adjusted under 35 U.S.C. 154(b) by 0 days.

(21) Appl. No.: 12/522,145

(22) PCT Filed: Jan. 2, 2008

(86) PCT No.: PCT/EP2008/000005
§ 371 (c)(1),
(2), (4) Date: Mar. 22, 2010

(87) PCT Pub. No.: WO2008/080999
PCT Pub. Date: Jul. 10, 2008

(65) Prior Publication Data
US 2010/0171352 A1    Jul. 8, 2010

(30) Foreign Application Priority Data
Jan. 4, 2007    (DE) .......................... 10 2007 001 617
Aug. 17, 2007    (DE) .......................... 10 2007 039 024

(51) Int. Cl.
*B60N 2/00*    (2006.01)
*B60N 2/235*    (2006.01)
(52) U.S. Cl. .................... 297/362; 297/367 R; 475/162; 475/175
(58) Field of Classification Search .................. 297/362, 297/367; 475/162, 175
See application file for complete search history.

(56) References Cited

U.S. PATENT DOCUMENTS
4,371,207 A * 2/1983 Wilking et al. .......... 297/344.15
(Continued)

FOREIGN PATENT DOCUMENTS
DE    4128945 A1    4/1992
(Continued)

OTHER PUBLICATIONS
Patent Treaty Cooperation, Written Opinion of the ISA (German), PCT/EP2008/000005, Jul. 7, 2009.
(Continued)

*Primary Examiner* — Anthony D Barfield
(74) *Attorney, Agent, or Firm* — Butzel Long

(57) ABSTRACT

An adjustment device for a vehicle component, in particular for the back rest of a vehicle seat, is proposed having a first fitting and a second fitting, wherein the relative position of the two fittings to one another can be changed by means of eccentric means, wherein a rotation of the eccentric means by means of a drive element is provided, wherein the adjustment device has a central element which is connected in a rotationally fixed fashion to the first fitting, wherein the drive element is provided mounted in an overlapping region by means of the central element. Furthermore, the invention relates to an adjustment device for a vehicle component, in particular for the back rest of a vehicle seat, having a first fitting (8) and a second fitting (11), wherein the relative position of the two fittings to one another can be changed by means of an eccentric (1) which transmits a torque from a drive (4) to the first fitting (8) so that said first fitting (8) rolls on the second fitting (11), and wherein the eccentric comprises at least one eccentric means (2) which can be driven by a driver (3) which is arranged on the drive (4).

14 Claims, 8 Drawing Sheets

U.S. PATENT DOCUMENTS

| | | | |
|---|---|---|---|
| 5,154,475 A | | 10/1992 | Kafitz |
| 5,308,294 A | * | 5/1994 | Wittig et al. ............... 475/162 |
| 5,312,158 A | | 5/1994 | Wittig |
| 5,871,414 A | * | 2/1999 | Voss et al. .................. 475/175 |
| 7,086,699 B1 | * | 8/2006 | Addison et al. ............. 297/374 |
| 7,281,765 B2 | * | 10/2007 | Scholz et al. ............... 297/362 |

FOREIGN PATENT DOCUMENTS

| | | |
|---|---|---|
| DE | 4119980 A1 | 12/1992 |
| DE | 19707998 A1 | 9/1998 |
| DE | 10011817 A1 | 12/2000 |
| DE | 102004011268 B3 | 9/2005 |
| DE | 102004039538 A1 | 3/2006 |
| DE | 10305407 B4 | 11/2006 |
| DE | 202005014192 U1 | 2/2007 |
| EP | 0432420 A | 6/1991 |
| WO | 2006040303 A2 | 4/2006 |
| WO | WO 2006136275 A1 * | 12/2006 |

OTHER PUBLICATIONS

Deutsches Patent—Und Markenamt, Search Report, DE102007039024.8, Dec. 1, 2008.

Patent Treaty Cooperation, International Search Report on Patentability (English Translation), PCT/EP2008/000005, Aug. 4, 2009.

Patent Treaty Cooperation, International Preliminary Report on Patentability, PCT/EP2008/000005, Jul. 7, 2009.

Patent Treaty Cooperation, Written Opinion of the ISA English Translation), PCT/EP2008/000005, Jul. 7, 2009.

* cited by examiner

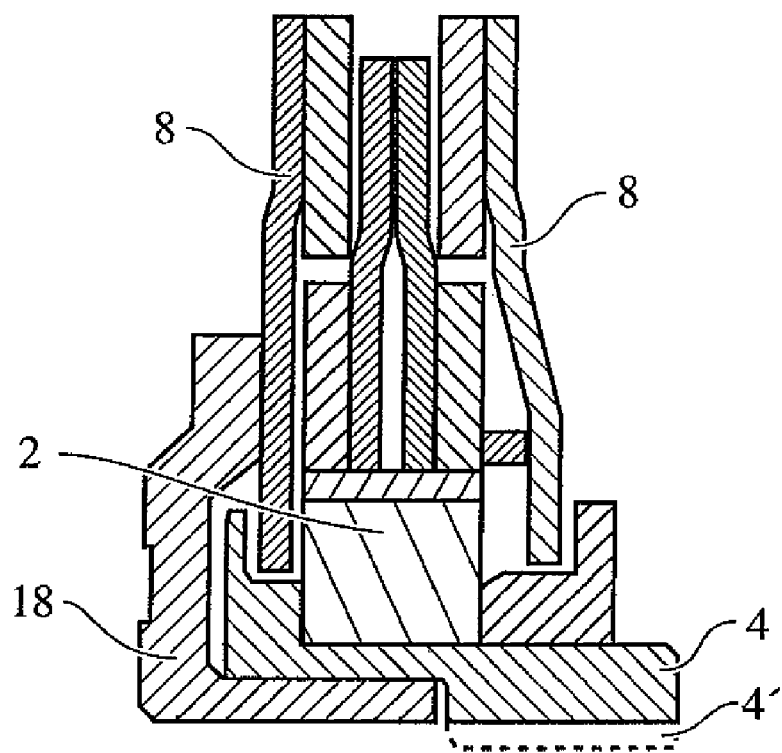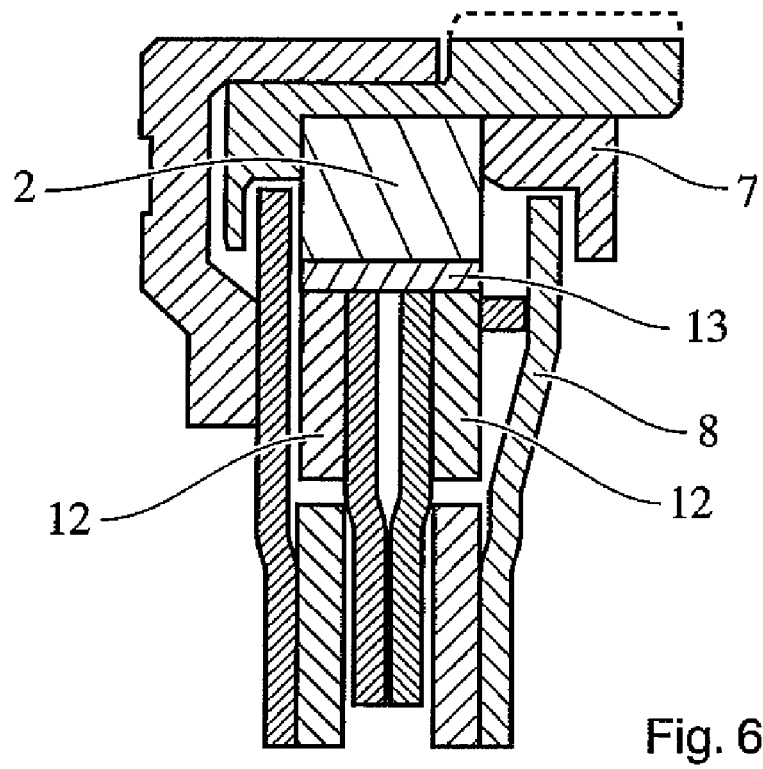
Fig. 6

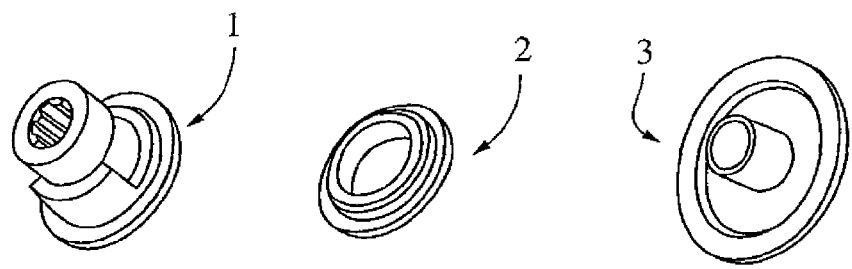
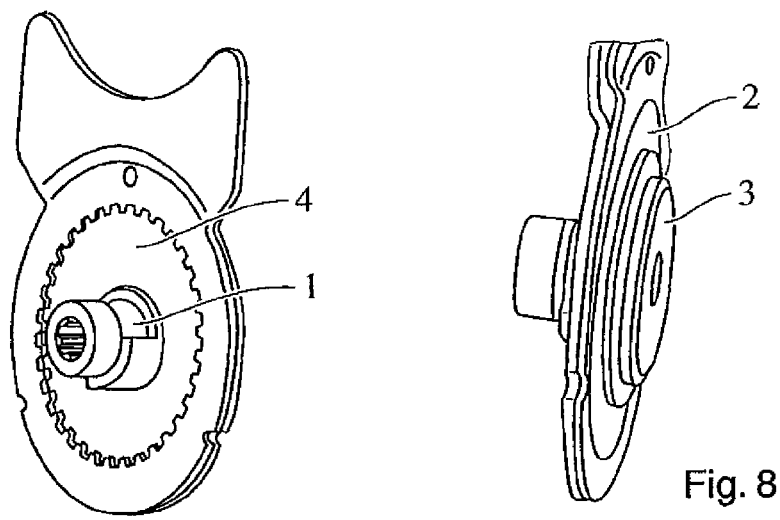
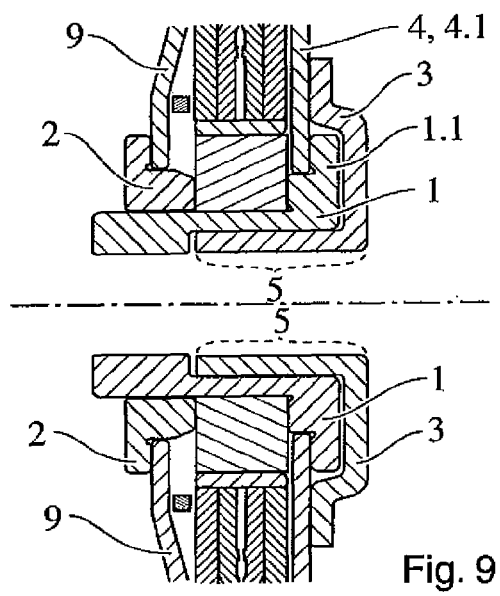
Fig. 7
Fig. 8
Fig. 9

ADJUSTER

CROSS REFERENCE TO RELATED APPLICATIONS

The present application is U.S. National Stage filing of International Application No. PCT/EP2008/000005, filed on Jan. 2, 2008, titled "ADJUSTMENT DEVICE FOR A VEHICLE SEAT" which claims priority to German Patent Application No. DE 10 2007 001 617.6 filed Jan. 4, 2007, International Application No. PCT/US2007/073034 filed Jul. 9, 2007 and German Patent Application No. DE 10 2007 039 024.8 filed Aug. 17, 2007, and the entire disclosures of which are incorporated herein by reference.

BACKGROUND

The disclosure relates to an adjustment device for a a seat or other vehicle component. In particular the disclosure relates to a powered adjuster for use with a backrest of a vehicle seat.

It is known to provide an adjuster for use in a vehicle seat wherein the adjuster includes a first fitting a second fitting, the relative position of the two fittings to one another being able to be changed by means of an eccentric which transmits a torque from a drive to the first fitting, so that the first fitting rolls on the second fitting and the eccentric includes at least one eccentric means or member which may be driven by a driver, the driver being arranged on the drive. Further it is known to provide a vehicle seat including a powered adjustment device as noted above and the adjustment device being used to adjust a vehicle component, such as a backrest of a vehicle seat. Such an adjustment device is known from International Patent Application Publication No. WO 2006/040303 which is of relatively complicated design. A further known device is disclosed in another document from the prior art is, German printed patent specification DE 10 2004 039 538. The adjustment device disclosed in DE 10 2004 039 538 has a free play which, however, is not always desirable and/or not always necessary. An inclination adjustment fitting for the backrest of a motor vehicle seat having a wobble mechanism is known from the German printed patent specification DE 10 2004 011 268 B3. Moreover, an articulated fitting for a vehicle seat is known from the German published patent specification DE 103 05 407 B4. In these known seat back inclination adjusters, however, weaknesses are evident in a powered embodiment of the adjustment device, in particular material weaknesses and/or increases in wear when the inclination adjuster is operated daily.

There has been a long felt need to provide an adjustment device of a more simple construction and which has no free play or only a small amount of free play. There has also been a long felt need to provide an adjustment device for a vehicle component that is highly compact and at the same time highly stable in its design and that such an inclination adjustment fitting firstly may be produced in a manner which is lightweight, cost-effective and stable over its service life. There has also been a long felt need to provide an adjustment device for a vehicle component that may provide a high degree of strength, in particular where there is an electromotive drive as well as unintended situations such as in an accident.

SUMMARY

In one exemplary embodiment, there is disclosed an adjustment device for a vehicle component, in particular for the backrest of a vehicle seat, the adjustment device, or adjuster, including a first fitting and a second fitting, the relative position of the two fittings to one another being able to be changed by means of an eccentric member which transmits a torque from a drive to the first fitting, so that the first fitting rolls on the second fitting and the eccentric comprises at least one eccentric means or member, which may be driven by a driver, which is arranged on the drive, when rotating the drive between the drive and the eccentric means, a frictional connection taking place at least at times.

In one exemplary embodiment, there is disclosed an adjustment device for a vehicle component, in particular for a motor vehicle component. Preferably, the adjustment device is a so-called recliner, by which the position of a backrest of a motor vehicle seat relative to a seat part may be changed for increasing the driving comfort and/or for transferring the backrest into a stowed or reclined position. Particularly preferably, such a vehicle seat comprises such an adjustment device to the right and left of the backrest and/or of the seat part. The adjustment devices are thus preferably connected to one another by a shaft. The vehicle seat may be a seat for one or more people, so that the vehicle seat is optionally also a seat bench, which preferably has a split backrest.

In one exemplary embodiment as disclosed the adjustment device has at least one first fitting which is preferably connected to the backrest of the motor vehicle seat and at least one second fitting which is preferably connected to the seat part of the motor vehicle seat, the relative position of the two fittings to one another being able to be changed by means of an eccentric. The adjustment device in one exemplary embodiment as disclosed may include a so-called wobbling adjuster, the principal mode of operation thereof being known, for example, from WO 2006/040303 and DE 10 2004 039 538. These publications are thus incorporated herein and thus are applicable as part of the disclosure. The eccentric thus transmits a torque produced manually or by a motor to the first fitting, so that the fitting rotates and rolls on the second fitting. Preferably, the first fitting has an external toothing and the second fitting has an internal toothing which mesh with one another. Preferably, the external toothing has at least one more teeth, so that the first fitting may wobble in the second fitting.

In one exemplary embodiment, as disclosed, the eccentric has at least one eccentric means, for example a wedge which is driven by a driver connected to a rotary drive, for example. Preferably, the driver is formed on the drive, for example, a drive pin. The driver releases the eccentric means initially from its fixed position and then drives the eccentric in order to rotate the first fitting. The driver may be located in two positions, in a neutral position and in a drive position. In the neutral position, it is spaced apart from the eccentric means, whilst in the drive position it bears against the eccentric means. It initially has to overcome a certain amount of free play, therefore, before the eccentric means is driven by the driver.

To reduce this free play and to achieve that the adjustment device has the effect that a torque is applied as directly as possible when changing position between the first and the second fitting, when rotating the drive a frictional connection results between the first and the second fitting (i.e. by means of friction a torque is transmitted from the drive to the eccentric means), which is sufficiently great to release the eccentric means from its fixed position and to drive the eccentric means sufficiently far in the rotational direction of the drive, until the driver bears against the eccentric means and, as a result, undertakes the drive function. The person skilled in the art recognizes that the drive may also be entirely carried out via the frictional connection (i.e. that in this case the driver might not be present or be used).

In one exemplary embodiment, there is disclosed an adjustment device of relatively simple construction that is easy to operate. As a certain amount of free play between the driver and the eccentric means may be permitted, it is possible to produce the adjustment device according to the disclosure with certain production tolerances, without having to dispense with a direct reaction of the gear mechanism to an applied torque. The adjustment device may be driven clockwise and counterclockwise.

Preferably, the drive is a cylindrical component, for example a pin, with an external radius, which cooperates with an internal radius of the eccentric means. Particularly preferably, the radii are designed to be different so that point contact or linear contact results between the drive and the eccentric means. By means of the contact, a frictional force is transmitted from the drive to the eccentric means, so that the eccentric means rotates with the drive.

Particularly preferably, the internal radius of each eccentric means has two radii, which do not have the same center point. The transition region between the radii cooperates with the external radius of the drive. Preferably, rotating the drive relative to the eccentric means leads to the point contact and/or linear contact thereof, by which the frictional forces are transmitted.

Preferably, the geometry of the drive and the eccentric means and/or the position thereof relative to one another are adjusted to one another so that the frictional connection takes place remote from the driver, i.e. not in the vicinity of the driver. Preferably, the point contact or linear contact of the drive and the eccentric means is arranged at a division of 1:1.5-1:2.5, and more particularly preferably at a division of 1:1.75-1:2.25 of the radius. The division is the circular are segment of the eccentric, measured from its end facing the driver to the contact point.

Preferably, the adjustment device according to the invention comprises two eccentric means. The eccentric means are preferably arranged and configured mirror symmetrically, the driver cooperating in the one rotational direction with the one eccentric member and in the other rotational direction with the other eccentric member.

In addition, the above applies equally to both eccentric member. Both eccentrics are driven by the drive means, irrespective of the rotational direction thereof.

Preferably, a spring and/or spring means is arranged between the two eccentric means which forces the eccentric means apart.

Preferably, the external radius of one or both eccentric means cooperates with a bearing shell. Particularly preferably, this bearing pair is designed to create as little friction as possible.

Further preferably, the drive, for example a drive pin, is connected, preferably welded, to a bushing.

In a further preferred embodiment, the drive, for example a drive pin, is mounted in one or more bearing shells.

The adjustment device according to the disclosure is suitable, in particular, for adjusting the inclination of the backrest of a motor vehicle seat. In a further exemplary embodiment, there is disclosed, therefore, a motor vehicle seat having the adjustment device according to the disclosure.

Preferably, such an adjustment device is arranged to the right and left of the backrest and/or of the vehicle seat. Particularly preferably, the adjustment devices are connected to one another by a shaft, which in turn may be driven manually or by motor.

In another exemplary embodiment, there is disclosed an adjustment device for a vehicle component, in particular for the backrest of a vehicle seat, the adjustment device having a first fitting and a second fitting, the relative position of the two fittings to one another being able to be changed by means of eccentric means, a rotation of the eccentric means being provided by means of a drive element, the adjustment device having a central element which is connected in a rotationally fixed fashion to the first fitting and the drive element being provided mounted in an overlapping region by means of the central element. As a result, according to the disclosure, it is advantageously possible that a higher degree of stability and resistance to wear of the adjustment device is achieved, in particular in the case of a powered or motorized drive, in particular driven by an electric motor, of the adjustment device. The inclination adjustment fitting and/or the adjustment device according to the present disclosure uses different components of an inclination adjustment fitting from those known from the patent publication WO 2006/040303 A2. These components relate, in particular, to gear plates, adapters, wedge elements and spring elements, the adjustment device according to the present disclosure providing, apart from these known components, specific components for adaptation and/or particularly advantageous use as a powered adjustment device, in particular a modified drive element, a modified guide bushing and the central element. The disclosure of the patent publication WO 2006/040303 A2, at least with regard to the known components, is thus incorporated in the present patent application by way of reference.

According to the disclosure, in one exemplary embodiment, it is particularly preferred if the drive element is provided axially secured by means of the central element and the first fitting or that the drive element is provided axially secured by means of the central element and a fitting element connected fixedly in terms of rotation to the first fitting. As a result, advantageously, considerable reinforcement and stabilizing of the adjustment device, in particular in the event of load peaks, may be provided which may occur, in particular, when operating the adjustment device by an electric motor.

It is further preferred according to a further exemplary embodiment of the disclosure that the drive element has a collar which is arranged between the central element and the first fitting or between the central element and the fitting element and/or that the drive element has an axial end which is provided projecting into a recess of the central element, the recess preferably being provided as a substantially circular groove. As a result, in a particularly simple manner the axial securing of the adjustment device may be effected and/or a variant of the adjustment device which is particularly stable and capable of bearing loads may be implemented.

Moreover, in a further exemplary embodiment, it is preferred according to the disclosure that the central element and the drive element have an internal diameter of substantially the same size. As a result, no axially acting forces are exerted on the adjustment device by the drive shaft, so that the loading thereof is reduced.

Moreover, in a further exemplary embodiment, it is preferred according to the disclosure that the drive element is provided for cooperation with a drive pin, preferably a positive connection being provided between both, relative to a rotational movement. As a result, the drive torque may be transmitted for an adjustment of the adjustment device in a simple and reliable manner.

Moreover, in a further exemplary embodiment, it is preferred according to the disclosure that the adjustment device is of laminate-type construction. As a result, it is possible to provide the adjustment device in a modular design and, consequently, adapt said adjustment device at a relatively low cost to different requirements.

A further subject of the present invention relates to a motor vehicle seat comprising an adjustment device according to the invention, the adjustment device being provided for powered adjustment and/or the motor vehicle seat comprising a motor, in particular an electric motor, for adjusting the adjustment device.

In another exemplary embodiment, there is disclosed a method for producing an adjustment device according to the disclosure, in a first method step the central element and the first fitting or the central element and the fitting element connected fixedly in terms of rotation to the first fitting being welded together by axially securing the drive element or the collar of the drive element and/or that in a second method step the further components of the adjustment device are mounted. As a result, it is advantageously possible according to the disclosure that, according to the first method step, a stable basis is permitted for the assembly and/or the mounting of the adjustment device.

The exemplary embodiments disclosed are described hereinafter with reference to FIGS. 1-14. These explanations are merely provided by way of example and do no restrict the general inventive idea.

FIG. 6 shows an additional exemplary embodiment of the adjustment device.

FIG. 7 shows the main components of an electromotive drive of the adjustment device according to an exemplary embodiment.

FIG. 8 shows part of the adjustment device according to one exemplary embodiment.

FIG. 9 shows a sectional view through two variants of the adjustment device according to the disclosed exemplary embodiments.

DETAILED DISCLOSURE

Figure 1:
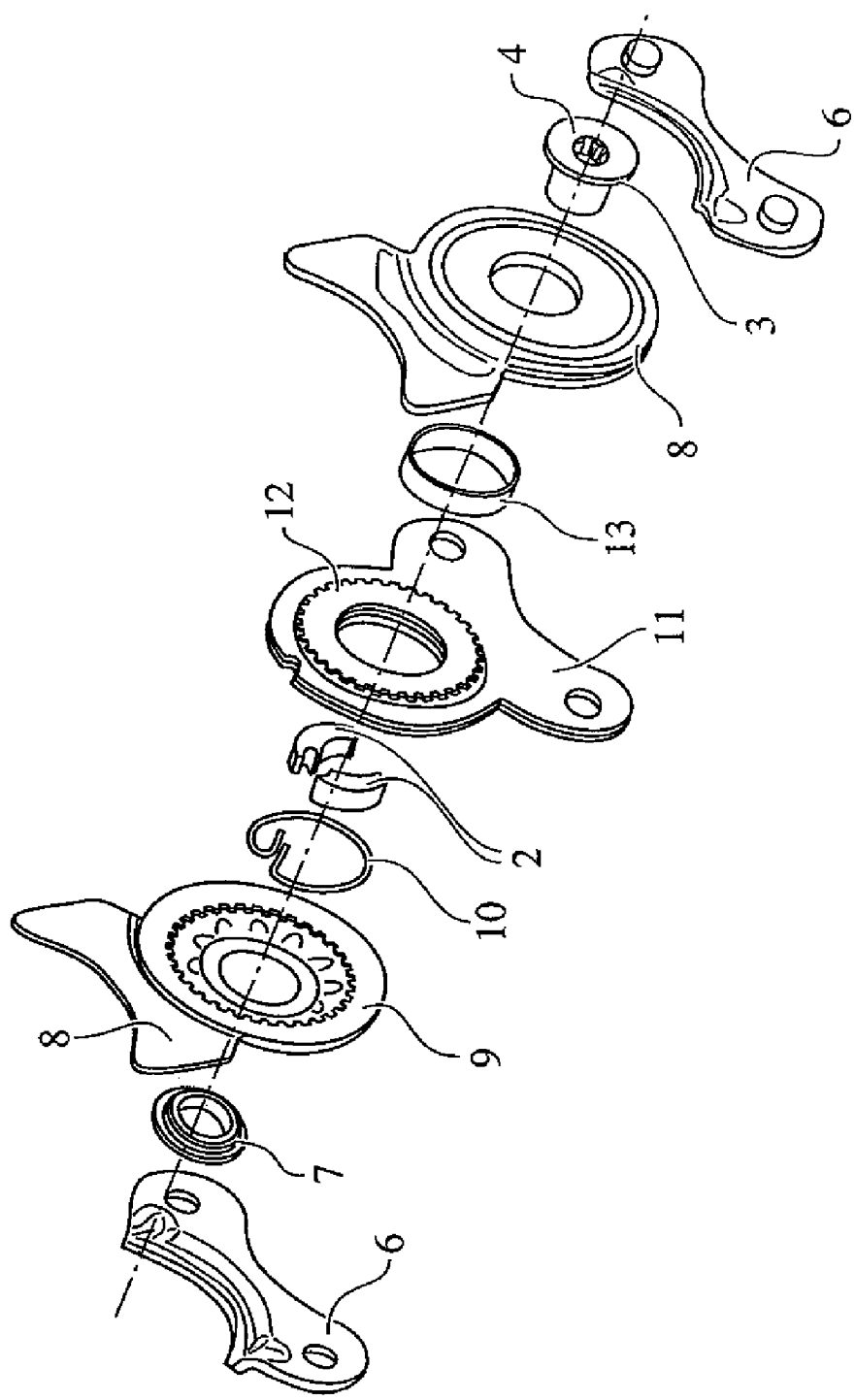
FIG. 1 shows an exploded view of the adjustment device according to one exemplary embodiment.

FIG. 1 shows an exploded view of an embodiment of the adjustment device according to an exemplary embodiment. The adjustment device includes a backrest adapter 8 as well as a seat adapter 11. By means of the retaining plates 6, the seat adapter 11 is fastened, in this case screwed, to the vehicle seat. The backrest adapter 8 is connected, preferably welded, to the backrest of the vehicle seat. The person skilled in the art recognizes that these functionalities of the two adapters 8, 11 may also be exchanged. The relative position of the backrest adapter 8 relative to the seat adapter 11 is determined by means of an eccentric 1, which includes two eccentric wedges or members 2. These two wedges 2 are preferably arranged symmetrically and, particularly preferably, mirror symmetrically relative to a straight line extending through the rotational axis D. The two wedges 2 are forced apart by an energy storage mechanism or spring means, in this case a spring 10, preferably an annular spring, the ends thereof engaging in notches in the wedges 2. The energy storage mechanism 10 forms part of the eccentric means 1. Moreover, the wedges 2 are at least partially arranged in a bearing shell 13 and are supported thereon. By means of the bearing shell 13, the friction between the eccentric and the seat adapter 11 may be reduced and a consistent, smooth running of the eccentric 1 may be achieved. Moreover, the device according to the exemplary embodiment includes a drive pin 4 which is driven manually or by motor. This drive pin 4 transmits its rotary motion, as is described in more detail below, to the eccentric 1 so that when the drive 4 is rotated, the externally toothed seat adapter 11 rolls in the internally toothed backrest adapter 8. The drive pin 4 is connected, preferably welded, to a bushing 7.

Figure 2:
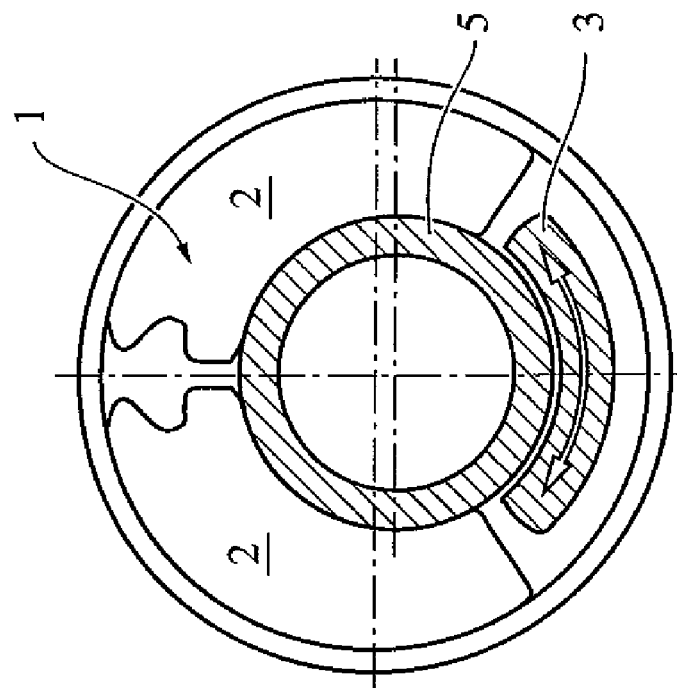
FIG. 2 shows a basic view of the adjustment device according to one exemplary embodiment.

The eccentric 1 of the device according to the exemplary embodiment is shown in FIG. 2. The eccentric 1 serves, as already mentioned, for driving the externally toothed internal gearwheel inside an internally toothed, external gearwheel including at least one more tooth. Accordingly, the mechanism is a so-called wobble mechanism. The eccentric is formed by wedges 2, which are forced apart by a spring 10, not shown here, for compensating for tangential play in the wobble mechanism. The wedges 2 are driven in one rotational direction or in the opposing rotational direction at least for a time by a driver 3 which is formed on the drive pin 4.

Figure 3:
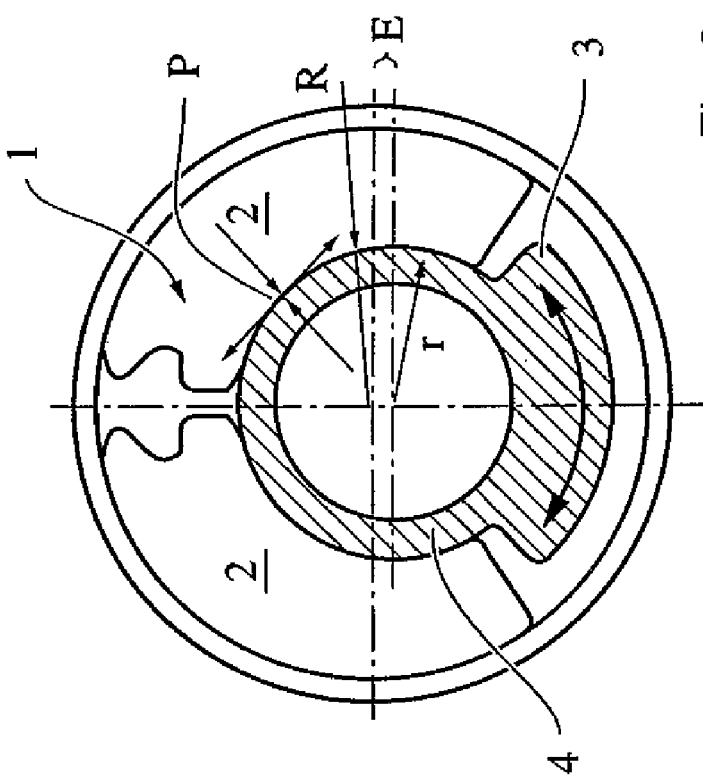
FIG. 3 shows a basic view of a known adjustment device.

In a previously known, manually actuated wobble mechanism, as shown for example in FIG. 3, the wedges 2 bear against a stationary, i.e. non-rotating, pin 5, and are exclusively driven by the direct contact of the driver 3 with the wedge 2 located closest in the rotational direction. From the neutral position, therefore, the drive pin 4 must initially overcome a certain amount of free play until the driver 3 bears against the relevant wedge 2. This free play is desirable in order to compensate for production tolerances and thus to keep the drive torque low.

However, in a drive according to exemplary embodiments disclosed, in particular a motorized drive, a direct reaction of the gear mechanism is desirable. According to the exemplary embodiments disclosed, therefore, it is provided even before the contact of the wedge 2 with the driver 3 that the rotating drive pin 4 exerts a torque by friction on the relevant wedge 2. The wedges 2 of arcuate configuration have, therefore, an internal radius of curvature R which is greater than the external radius r of the drive pin 4. Remote from the driver, approximately in the region of a division of 1:2 of the internal circular arc of the wedge 2 in the vicinity of the driver, a contact point P and/or a contact line is formed, via which the associated wedge 2 (in this case the right-hand wedge) even before contact with the driver 3 is released from its clamped position and is displaced in the rotational direction of the drive pin 4. The eccentric 1 effects a wobble motion between the two fittings 8, 11. The wedges 2 serve, however, not only as drive transmission means, but additionally to block the eccentric in the non-driven state in its respective position in the event that a torque is transmitted from the internally toothed gearwheel 9 to the externally toothed gearwheel 12, i.e. for example in the event of an accident a torque is transmitted from the backrest to the eccentric 1.

Figure 4:
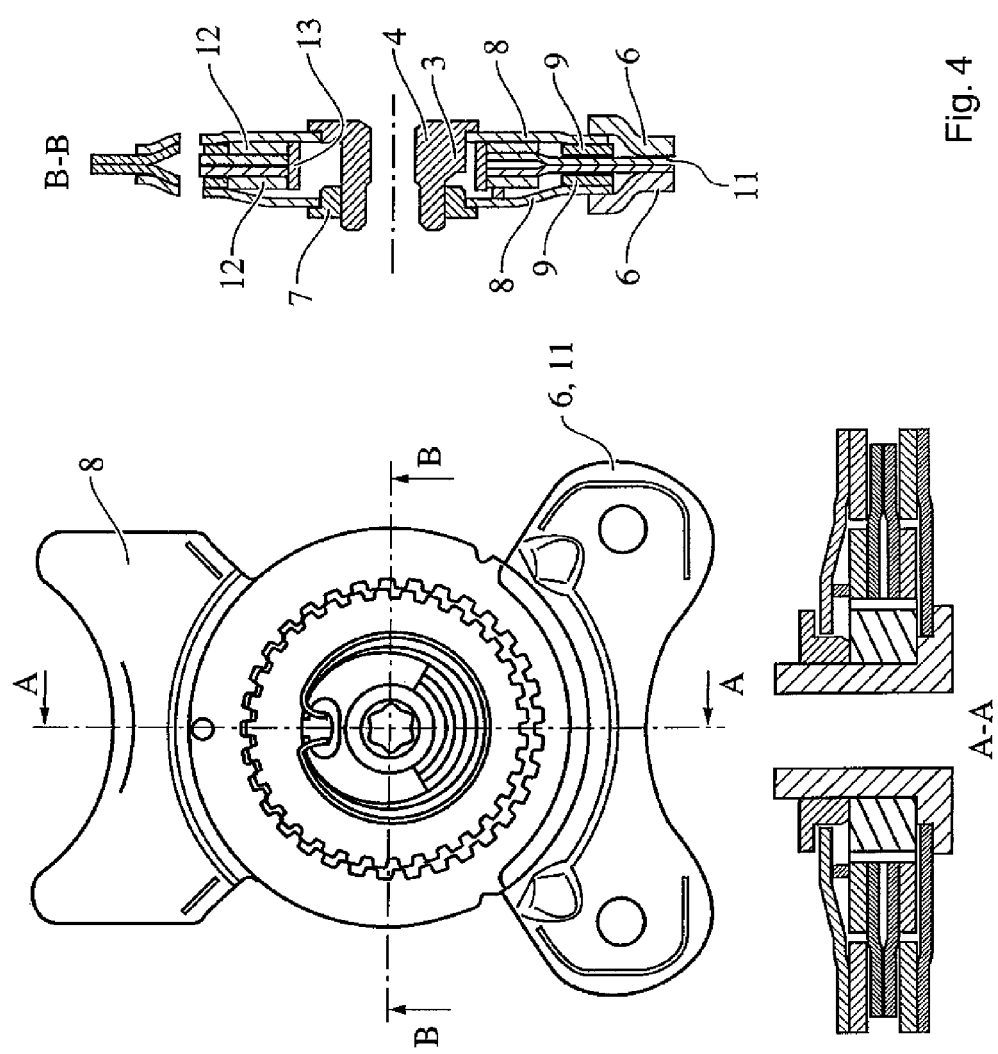
FIG. 4 shows an embodiment of the adjustment device according to one exemplary embodiment.

FIG. 4 shows a first design of an adjustment device according to one exemplary embodiment. The mechanism includes the retaining plates 6 on the seat part side, a bushing 7, the backrest adapter 8 with an internally toothed gearwheel 9, the spring 10, which spreads apart the wedges 2, the seat part adapter 11 with the externally toothed gearwheels 12, the bearing shell 13 and the drive pin 4 with the driver 3 which is formed thereon. In this case, the bushing 7 rotates together with the drive pin 4 provided with a collar, by which it is connected fixedly in terms of rotation, for example, by welding.

Figure 5:
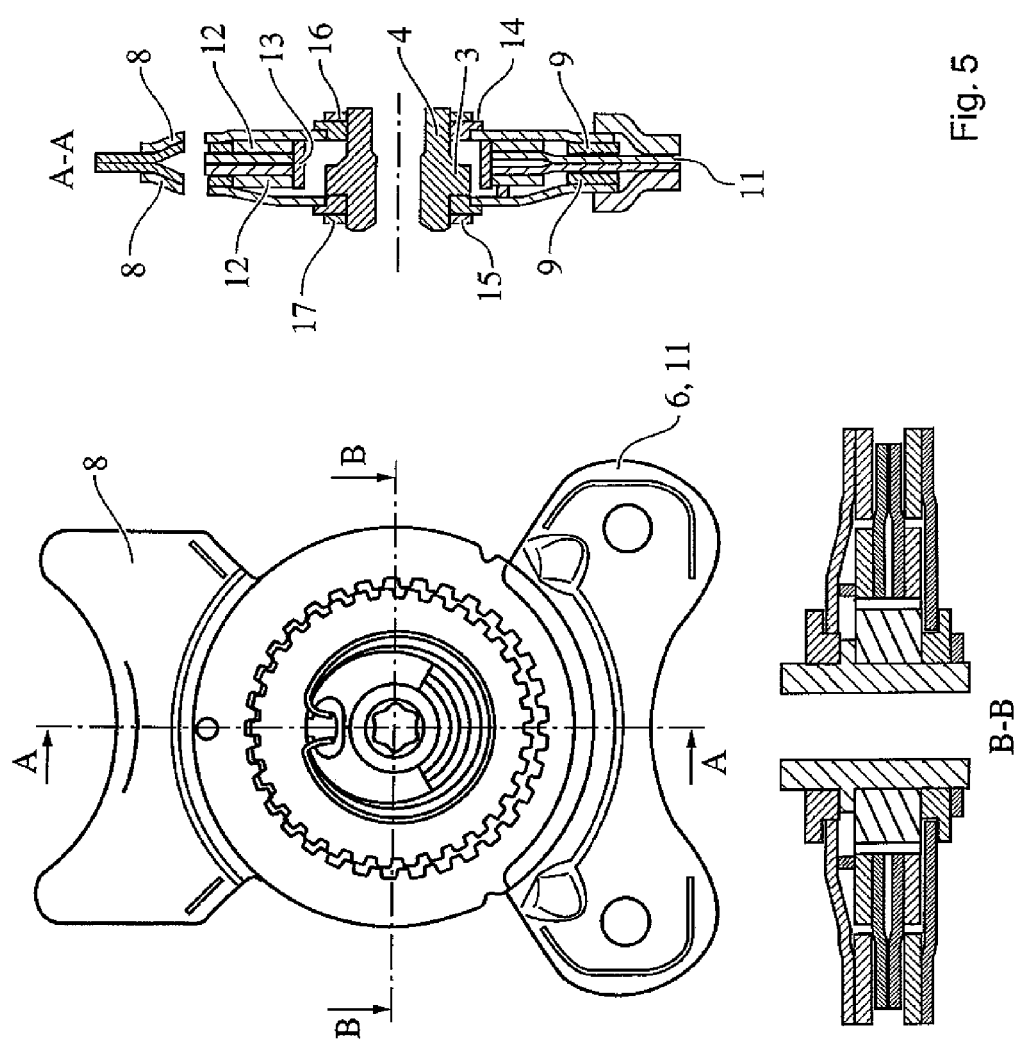
FIG. 5 shows a further exemplary embodiment of the adjustment device.

A further exemplary embodiment is shown in FIG. 5. This embodiment substantially corresponds to the embodiment according to FIG. 4, and in this embodiment the drive pin 4 rotating in two bearing shells 14, 15 and at each end being welded for axial securing to closure plates 16, 17.

FIG. 6 shows a further exemplary embodiment of the adjustment device. In this exemplary embodiment, the adjustment device includes a bearing 18 which is connected to the backrest adapter 8. The drive 4 is mounted on the bearing 18. This drive has on its inner face positive and/or non-positive connection means 4', for example teeth, which cooperate with corresponding positive and/or non-positive connection means of a motorized drive. By means of the bearing 18, in particular, the service life of the adjustment device is improved.

The person skilled in the art understands that the adjustment device may be substantially constructed in a manner of a laminate construction; i.e. a plurality of backrest adapters 8 and/or seat part adapters 11 which are arranged in layers.

In FIG. 7, the main components of the modifications and/or components required for the powered variant of an adjustment device 10 according to the exemplary embodiment are shown schematically. Reference numeral 1 denotes a drive element for the arrangement in a powered adjustment device according to the exemplary embodiment. Reference numeral 2 denotes a guide bushing for the arrangement in a powered adjustment device according to the exemplary embodiment. Reference numeral 3 denotes a central element for the arrangement in a powered adjustment device according to the exemplary embodiment.

In FIG. 8, part of the adjustment device 10 according to the exemplary embodiment is shown schematically. A first fitting 4 is shown in addition to the central element 3 and the drive element 1.

In FIG. 9, a sectional view through the adjustment device 10 according to the exemplary embodiment is shown schematically. In this case, an axially extended overlapping region 5 (extending along the rotational axis of the adjustment device 10) of the central element 3 and of the drive element 1 may be seen. From the sectional view in FIG. 3, it may be seen that by the material connection (in particular a weld and in particular a laser weld), between the central element 3 and the first fitting 4 and/or between the central element 3 and a fitting element 4.1 connected fixedly in terms of rotation to the first fitting 4, a collar 1.1 of the drive element 1 and thus at the same time also the drive element 1 itself are fixed against an axial displacement along the rotational axis of the adjustment device 10. This corresponds to the first method step of the production method of the adjustment device 10 according to the exemplary embodiment. Subsequently thereto, the other components and/or parts of the adjustment device 10 are mounted which corresponds to the second method step of the production method of the adjustment device 10 according to the exemplary embodiment. Preferably, the guide bushing 2 is connected and/or welded to the drive element 1 and/or to the first or second fitting 4, 9, so that the adjustment device 10 has further improved behavior against forces which act in the direction of the axial dismantling of the adjustment device 10.

Figure 14:
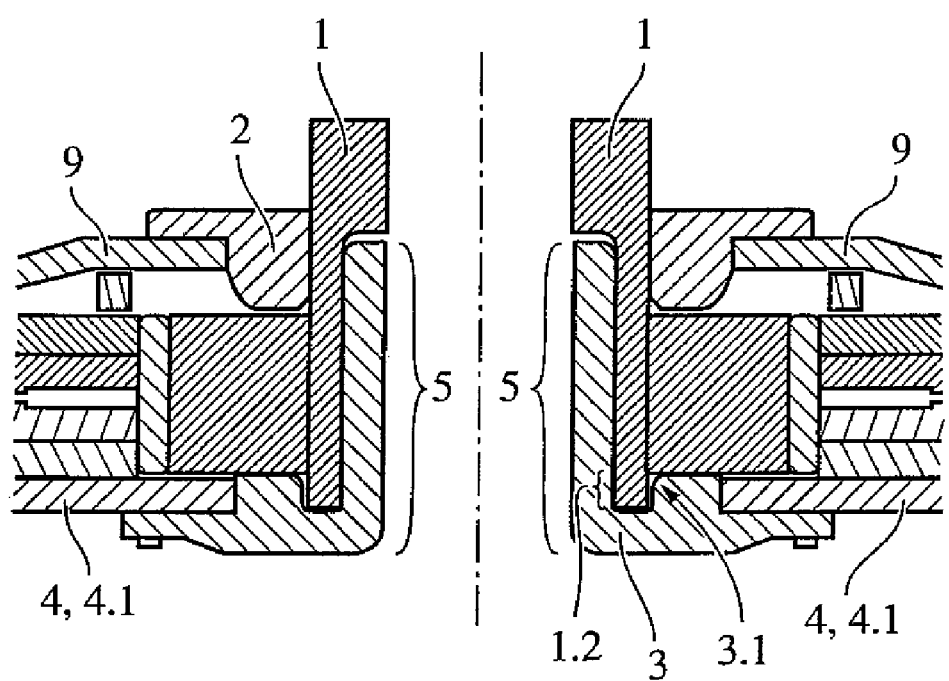
FIG. 14 shows a sectional view through two variants of the adjustment device according to the exemplary embodiments.

In FIG. 14, a variant of the adjustment device 10 according to the exemplary embodiment shown in FIGS. 7, 8 and 9, is shown in sectional view schematically through the adjustment device 10 according to the exemplary embodiment. In this case, the same reference numerals from the previous figures apply to the same components and/or parts of the adjustment device 10. In contrast to the variant of the adjustment device 10 according to the exemplary embodiment shown in FIG. 9, in the variant according to FIG. 14 it is provided that instead of the collar 1.1 of the drive element 1 shown in FIG. 9, an axial end 1.2 of the drive element 1 projects into a substantially circular groove and/or recess 3.1 of the central element 3. As a result, in the radial direction an undercut of the central element 3 is produced relative to the drive element 1, which leads to an increased load-bearing capacity of the adjustment device 10 according to this variant and moreover also—in particular due to a smaller and more lightweight design of the end 1.2 of the drive element 1 relative to the design of the collar 1.1 of the drive element—to a saving in weight, material and to a reduction in costs. In the variant shown in FIG. 14, it is further provided—alternatively or additionally to the undercut of the central element 3 relative to the drive element 1—that the overlap region 5 is provided to be larger and/or longer so that relative to the design of the overlap region 5 according to FIG. 9, in particular an extension of the overlap region 5 in the axial direction is provided beyond the region of the eccentric means 6 in the variant according to FIG. 14.

Figure 10:
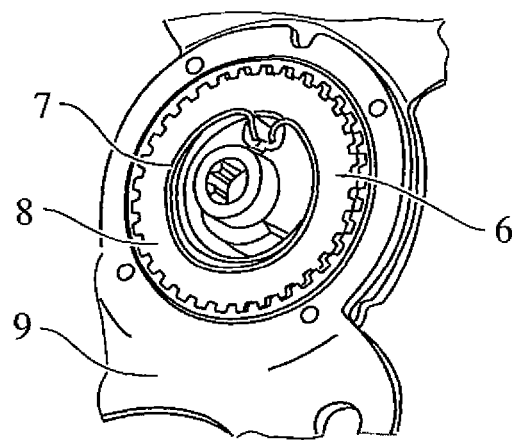
FIG. 10 shows a perspective view of a partially mounted adjustment device according to one exemplary embodiment.

In FIG. 10 a perspective view of a partially mounted adjustment device according to the exemplary embodiment is shown schematically. After the mounting of a subassembly which corresponds to half of the adjustment device is completed, the adjustment device is assembled according to the manner provided in the publication WO 2006/040303 A2, namely by eccentric means 6 in the form of, for example, wedges, a spring, gear plates 8, and a second fitting 9 as well as a guide bushing.

Figures 11, 12:
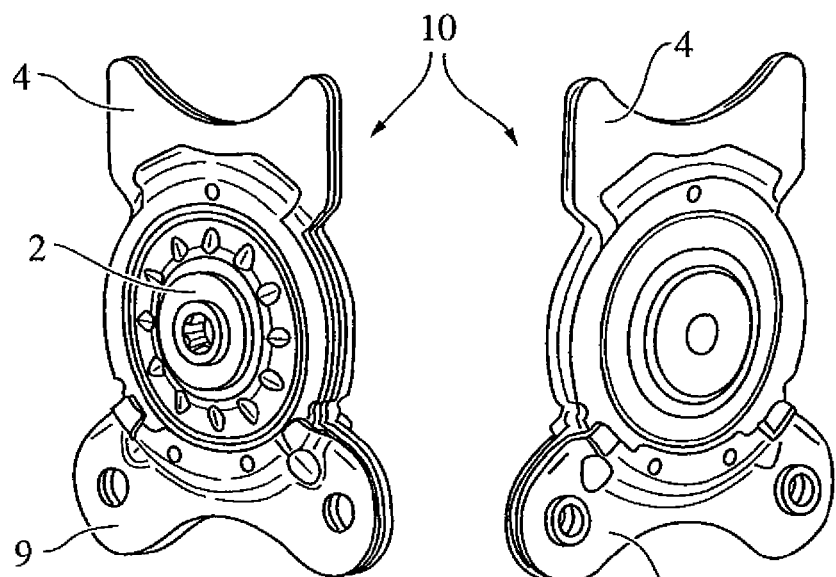
FIG. 11 shows a perspective view of a mounted adjustment device according to one exemplary embodiment.
FIG. 12 shows a perspective view of a mounted adjustment device according to one exemplary embodiment.

In FIGS. 11 and 12, two perspective views of the fully mounted powered adjustment device 10 according to the exemplary embodiment are shown schematically. In this case, the guide bushing 2 is welded to the drive element and/or to the first fitting 4 or the second fitting 9.

Figure 13:
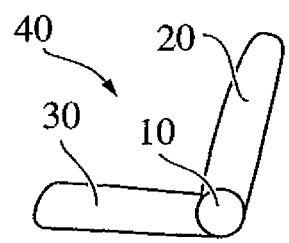
FIG. 13 shows a schematic view of a vehicle seat comprising an adjustment device according to one exemplary embodiment.

According to the exemplary embodiment, it is particularly preferably provided that the adjustment device 10 is provided on a vehicle seat as the vehicle component, and that the adjustment device 10 is provided for the inclination adjustment of the backrest 20 of a vehicle seat 40 including, in addition to the backrest 20, a seat part 30. This is shown schematically in FIG. 13.

What is claimed is:

1. An adjustment device for a vehicle component, the adjustment device comprising:

a first fitting and a second fitting, the first fitting and the second fitting being arranged to be movable relative to each other;

an eccentric member positioned between the first fitting and the second fitting, the eccentric member for controlling the relative movement of the first and second fittings;

a drive for inputting a torque from the drive to the adjustment device, the eccentric member for transmitting the torque from the drive to the first fitting so that the first fitting rolls on the second fitting, the drive including a driver arranged on the drive, the driver for driving the eccentric member; and wherein a direct frictional connection is maintained between the drive and the eccentric member at all times, and when the drive is rotated the torque from the drive is transmitted to the eccentric by frictional forces to thereby control movement of the first fitting and the second fitting.

2. The adjustment device of claim 1, wherein the adjustment device has a neutral position in which the driver does not cooperate with the eccentric member.

3. The adjustment device of claim 2, wherein the frictional connection occurs before the driver cooperates with the eccentric member.

4. The adjustment device of claim 3 wherein eccentric member includes and internal radius (R) and the drive includes an external radius (r) which cooperates with the internal radius (R) of the eccentric member.

5. The adjustment device of claim 4, wherein the frictional connection remote from the driver takes place at a division of 1:1.5-1:2.5.

6. The adjustment device of claim 1 wherein the adjustment device comprises two eccentric members.

7. The adjustment device of claim 6, further comprising a spring that acts between the two eccentric members.

8. The adjustment device of claim 6 wherein the external radius (r) of the eccentric member cooperates with a bearing shell.

9. The adjustment device of claim 1 wherein the drive comprises a drive pin for engaging the eccentric member and a bushing, the pin connected to the bushing.

10. The adjustment device of claim 9 wherein the drive pin is provided at its ends with closure plates.

11. An adjustment device for a backrest of a vehicle seat for use in a motor vehicle, the adjustment device comprising:
   a first fitting and a second fitting, the relative position of the two fittings to one another being able to be changed by an eccentric means positioned between the first fitting and the second fitting;
   a drive element for rotating the eccentric means; wherein the adjustment device has a central element which is connected in a rotationally fixed fashion to the first fitting; wherein the drive element is mounted in an overlapping region by means of the central element; and wherein the adjustment device has a laminate construction; and wherein a direct frictional connection is maintained between the drive and the eccentric means at all times, and when the drive is rotated a torque from the drive is transmitted to the eccentric by frictional forces to thereby control movement of the first fitting and the second fitting.

12. The adjustment device of claim 11, wherein the drive element is provided axially secured by the central element and a fitting element connected rotationally fixed to the first fitting.

13. The adjustment device of claim 12 wherein the drive element includes a collar arranged between the central element and the fitting element and the drive element includes an axial end provided projecting into a recess of the central element.

14. A motor vehicle seat having an adjustment, the adjustment device comprising:
   a first fitting and a second fitting, the first fitting and the second fitting being arranged to be movable relative to each other;
   an eccentric member positioned between the first fitting and the second fitting, the eccentric member for controlling the relative movement of the first fitting and the second fitting;
   a drive for inputting a torque to the adjustment device, the eccentric member for transmitting the torque from the drive to the first fitting so that the first fitting rolls on the second fitting; the drive including a driver arranged on the drive, the driver for driving the eccentric member; and wherein a direct frictional connection is maintained between the drive and the eccentric member at all times, and when the drive is rotated the torque from the drive is transmitted to the eccentric by frictional forces to thereby control movement of the first and second fitting; and wherein the frictional connection occurs before the driver cooperates with the eccentric member.

* * * * *